(No Model.)
J. A. BARNES.
NECK YOKE ADJUSTER.
No. 258,692. Patented May 30, 1882.
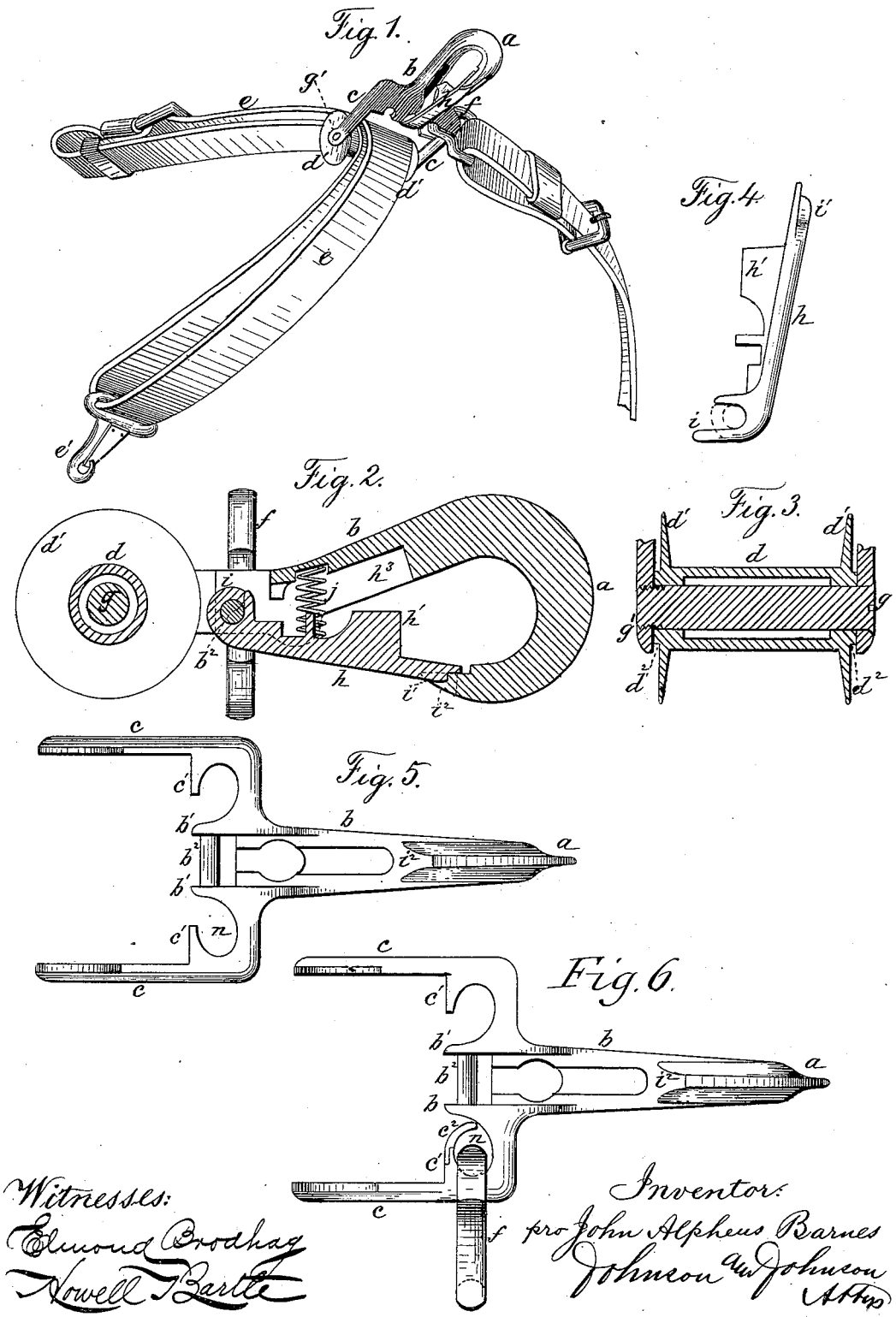
Witnesses:
Edmund Brodhag
Lowell Bartle
Inventor:
pro John Alpheus Barnes
Johnson and Johnson
Attys

UNITED STATES PATENT OFFICE.

JOHN A. BARNES, OF LACLEDE, MISSOURI.

NECK-YOKE ADJUSTER.

SPECIFICATION forming part of Letters Patent No. 258,692, dated May 30, 1882.

Application filed April 14, 1882. (No model.)

*To all whom it may concern:*

Be it known that I, JOHN ALPHEUS BARNES, a citizen of the United States, residing at Laclede, in the county of Linn and State of Missouri, have invented new and useful Improvements in Neck-Yoke Adjusters for Harness, of which the following is a specification.

In a patent granted to me January 13, 1880, No. 223,575, I have described and claimed a neck-yoke adjuster for double-team harness in which a snap-hook, a roller, and a side link are combined for use with the hame and martingale straps and the neck-yoke chain of the pole for the purpose of preventing the jamming, rubbing, and bruising of the shoulders of the team.

My present improvement is directed to provision for rendering the device better adapted for the purpose and more durable; and the specific matters of novelty will form the subject of my claim.

Referring to the annexed drawings, Figure 1 represents the device as it is applied to the hame-strap, the martingale-strap, and the neck-yoke chain; Fig. 2, a section taken through the snap-hook; Fig. 3, a section taken through the roller. Fig. 4 is the snap-hook tongue, showing the manner of forming its pivot-joined end; Fig. 5, the hook-frame part as it is cast; and Fig. 6, a similar view, showing the manner of forming the confining-eye for the martingale-link.

A metal frame forms, in connection with a tongue, what is known as a "snap-hook," $a$, having its shank $b$ formed with a T-head, from the ends of which arms $c$ extend parallel with the shank part, and carry a flanged roller, $d$, over which passes the hame-strap $e$, while at one of the angles of the T-head is confined a link, $f$, with which the martingale-strap connects. The snap-hook part $a$ connects with the ring of the neck-yoke chain or ring, and the position of the link $f$ is such that the connection therewith of the martingale-strap serves to hold the tongue down and to keep the collar to the shoulders of the horse. In a sudden lateral thrust of the tongue or pole the roller will traverse the hame-strap, and thus relieve the collar from the force of such thrust, because the neck-yoke chain or ring being connected with the snap-hook $a$, the latter will ride with the roller upon the strap which connects with the hames, one end of said strap being connected with one hame, and the other end of said strap having a snap-hook, $e'$, by which it is connected with a ring on the other hame.

The roller is made hollow for lightness and to reduce friction, and has flanges $d'$ $d'$ to hold it upon the strap, while shoulders $d^2$ $d^2$ upon its ends serve to form the bearings against the arms which carry it, keeping the flanges from contact with said arms, and thus prevent them from being worn sharp and from cutting the strap. The bearings for the roller are formed by a bolt, $g$, which screws into a threaded hole, $g'$, in one of the arms, which I find to be better and more secure than by a nut on the bolt.

The T-head of the snap-hook is cast with middle arms, $b'$ $b'$, much shorter than the side arms, and a pin, $b^2$, between said short arms, upon which pin the tongue $h$ is mounted, and forms, with the hook part of the frame, what is known as the "snap-hook." The tongue is pivot-joined to this cross-pin $b^2$, and to make such connection the tongue has a U shape, forming a strap end, $i$, which is placed upon and bent over the pin, so as to form an eyed connection with the end of the tongue working between the short arms $b'$ as within a socket. The free end of the tongue has a flat and a middle raised or rib part, $i'$, and the hook part proper of the frame has a forked or slotted formation, $i^2$, which laps upon the inner side of the hook, with its rib entering the forked end of the latter, and forming an interlocking connection, so that the tongue is rigidly braced at both ends. A spring, $j$, seated in a recess in the shank of the hook, bears upon the tongue, so as to constantly press and to hold it in locked connection with the forked end of the hook, while for the purpose of protecting the spring and preventing the yoke-ring chain from getting under the tongue and endangering its breaking it is formed with a projection, $h'$, on its under side, extending to, or nearly to, the shank of the hook, which has a recess, $h^3$, to receive said projection when the tongue is pressed in to connect or disconnect the hook with the ring of the yoke-chain. This gives a better and more durable construction than a spring-plate riveted to the hook-shank, for to make a spring-plate strong enough to withstand the thrusts or jerks of the yoke-chain it would be very difficult, if not impossible, to press in the spring by the thumb to apply or release the hook.

The bearing-arms for the roller are strengthened and braced at their connection with the T-head of the hook-shank by the inward projections $c'\ c'$, one of which is formed to receive a wing, $c^2$, which makes an eye, $n$, to receive and hold the link $f$ in place. This wing is brazed on the projection $c'$ by a suitable lap-joint after the link is in place, and that part of the link secured in the eye $n$ is so formed as to hold the link in proper position upon the arm.

I claim—

1. In a neck-yoke adjuster for double-team harness, the combination, with the T-shank having the forked or slotted hook $i^2$ and the arms $c\ c$, of the tongue $h$, having the rib $i'$ and the projection $h'$, the spring $j$, the flanged roller $d$, and the link $f$, substantially as described, for the purpose specified.

2. In a neck-yoke adjuster, the hooked T-shank having the side and middle arms, $c\ c\ b'\ b'$, the latter formed with the cross-pin $b^2$, in combination with the tongue $h$, having the eye-forming strap end $i$, the projection $h'$, and the ribbed end $i'$, and the spring $j$, the flanged roller, and the link $f$, substantially as and for the purpose set forth.

3. In a neck-yoke adjuster, the snap-hook frame having the confining-eye $n$ for the side link, formed by the projection $c'$, and the wing $c^2$, as shown and described.

4. In a neck-yoke adjuster, the flanged roller $d$, having a hollow hub and end shoulders, $d'\ d'$, in combination with the hook-frame arms $c\ c$, one of which has screw-threaded hole $g'$ and the screw-bolt $g$, as shown, and for the purpose described.

In testimony whereof I have hereunto set my hand in the presence of two subscribing witnesses.

JOHN ALPHEUS BARNES.

Witnesses:
   C. A. DUNSWORTH,
   J. E. MCANINCH.